(12) United States Patent
Huang et al.

(10) Patent No.: US 12,265,181 B2
(45) Date of Patent: Apr. 1, 2025

(54) SCANNER, AND COAXIAL, AND NON-COAXIAL LIDAR SYSTEMS WITH SAME

(71) Applicant: HANGZHOU XIGHT SEMI-CONDUCTOR CO., LTD., Zhejiang (CN)

(72) Inventors: Jinxi Huang, Zhejiang (CN); Zihao Shan, Zhejiang (CN)

(73) Assignee: Hangzhou Xight Semi-conductor Co., Ltd., Hangzhou (CN)

(*) Notice: Subject to any disclaimer, the term of this patent is extended or adjusted under 35 U.S.C. 154(b) by 0 days.

(21) Appl. No.: 18/018,032

(22) PCT Filed: Sep. 3, 2021

(86) PCT No.: PCT/CN2021/116482
§ 371 (c)(1),
(2) Date: Jan. 25, 2023

(87) PCT Pub. No.: WO2022/022747
PCT Pub. Date: Feb. 3, 2022

(65) Prior Publication Data
US 2023/0273300 A1    Aug. 31, 2023

(30) Foreign Application Priority Data
Jul. 29, 2020    (CN) .......................... 202010744507.3

(51) Int. Cl.
*G01S 7/481* (2006.01)
*G01S 7/48* (2006.01)
*G01S 17/08* (2006.01)

(52) U.S. Cl.
CPC .......... *G01S 7/4817* (2013.01); *G01S 7/4808* (2013.01); *G01S 7/4812* (2013.01); *G01S 17/08* (2013.01)

(58) Field of Classification Search
CPC .... G01S 7/4808; G01S 7/4811; G01S 7/4812; G01S 7/4815; G01S 7/4816;
(Continued)

(56) References Cited

U.S. PATENT DOCUMENTS

| 2018/0267250 A1* | 9/2018 | Hosseini | ................. G01S 17/42 |
| 2019/0033522 A1* | 1/2019 | Baba | ...................... G02B 6/125 |

(Continued)

FOREIGN PATENT DOCUMENTS

| CN | 103954602 A | * | 7/2014 |
| CN | 105162515 A | * | 12/2015 |

(Continued)

*Primary Examiner* — Yuqing Xiao
*Assistant Examiner* — Benjamin Richard Hebert
(74) *Attorney, Agent, or Firm* — Global IP Services; Tianhua Gu

(57) ABSTRACT

A scanner and coaxial and non-coaxial lidar systems with the scanner are provided. The scanner includes a wafer substrate, optical switches, and grating antenna groups; optical switches and the grating antenna groups are fixed on an upper end of the wafer substrate, one grating antenna group is optically connected to one optical switch port; the grating antenna groups are distributed in an array to form a grating part, and an upper side of the grating part is covered with a lens module. Two-dimensional scanning is performed by the scanner, combined with distance information in the third dimension calculated by the system, achieving three-dimensional imaging. Through joint participation of an optical amplifier and grating antenna groups, noise removal is realized, reducing external interference on detection results. The system is integrated on a chip, has a small size and is easy to install, which is convenient for cost reduction and mass production.

14 Claims, 2 Drawing Sheets

(58) Field of Classification Search
CPC ...... G01S 7/4817; G01S 7/4818; G01S 7/484; G01S 7/486; G01S 7/4863; G01S 17/08
See application file for complete search history.

(56) References Cited

U.S. PATENT DOCUMENTS

| | | | |
|---|---|---|---|
| 2019/0094651 A1* | 3/2019 | Timurdogan | G02F 1/335 |
| 2019/0243000 A1* | 8/2019 | Shim | G01S 17/931 |
| 2019/0317199 A1 | 10/2019 | Chong | |
| 2020/0110161 A1* | 4/2020 | Talty | G01S 17/34 |
| 2020/0256958 A1* | 8/2020 | Piggott | G01S 17/894 |
| 2021/0055391 A1* | 2/2021 | LaChapelle | G01S 17/26 |
| 2021/0181320 A1* | 6/2021 | Oza | G01S 7/4812 |
| 2021/0278542 A1* | 9/2021 | Murakami | G01S 17/931 |
| 2021/0293934 A1* | 9/2021 | Sun | G01S 7/4814 |
| 2022/0158418 A1* | 5/2022 | Satoh | G01S 17/894 |

FOREIGN PATENT DOCUMENTS

| | | |
|---|---|---|
| CN | 107102322 A | 8/2017 |
| CN | 208013431 U | 10/2018 |
| CN | 109298404 A | 2/2019 |
| CN | 110118960 A | 8/2019 |
| CN | 110168430 A | 8/2019 |
| CN | 110244281 A | 9/2019 |
| CN | 110857977 A | 3/2020 |
| CN | 111856481 A | 10/2020 |
| JP | 2003333633 A | 11/2003 |
| WO | 2017113094 A | 7/2017 |

\* cited by examiner

SCANNER, AND COAXIAL, AND NON-COAXIAL LIDAR SYSTEMS WITH SAME

TECHNICAL FIELD

The present disclosure relates to the field of lidars, in particular, to a scanner, a coaxial lidar system with the scanner, and a non-coaxial lidar system with the scanner.

BACKGROUND

A lidar is a sensor that uses a laser to detect objects and measure distances. It includes a radiating device that emits light beams onto a target, and a receiving device that measures delay and intensity of reflected light beams to calculate the distance between the target and the sensor.

Conventional lidars include mechanical scanning lidars, flash lidars, micro electromechanical system (MEMS) scanning lidars, and optical phased array (OPA) lidars; the traditional mechanical scanning lidars use mechanical devices that rotate and scan to obtain 360-degree point cloud information, thereby building a complete three-dimensional image; however, since mechanical scanning has a low speed and low resolution, the three-dimensional image often fails to present a complete picture of small objects; secondly, since mechanical scanning lidars usually have a large size, multiple wire harnesses are required to assemble them, increasing production costs; flash lidars have a short ranging distance, which is accurate only in the range of 10 m to 20 m; MEMS scanning lidars have poor stability when used, the MEMS adopted are usually below the automotive grade and will result in high risk when used for long time, and they are also expensive per unit.

It is costly to manufacture OPA lidars, which prevents their industrialized production.

SUMMARY

The present disclosure provides a scanner, a coaxial lidar system with the scanner, and a non-coaxial lidar system with the scanner.

The present disclosure provides the following technical solutions:

The scanner includes a wafer substrate, a plurality of optical switches, and a plurality of grating antenna groups; the plurality of optical switches and the plurality of grating antenna groups are fixed on an upper end of the wafer substrate, the plurality of optical switches and the plurality of grating antenna groups correspond one to one, one grating antenna group is optically connected to one optical switch port; the plurality of grating antenna groups are distributed in an array to form a grating part, and an upper side of the grating part is covered with a lens module.

In an embodiment, the lens module includes a plurality of lenses arranged at intervals, and curvature values of the plurality of lenses are different.

In an embodiment, the lens module is slidably attached to the grating part, and capable of being finely adjusted up and down on the upper side of the grating part by a lift motor.

The present disclosure provides a coaxial lidar system, the coaxial lidar system is integrated by a plurality of splitters and working parts connected to the plurality of splitters, and the working parts include:

a laser, for emitting light and outputting an optical signal, a first splitter in the plurality of splitters divides the optical signal into a first optical signal and a local optical signal;

an optical circulator, for enabling bidirectional communication of optical signals;

an optical amplifier, for amplifying the first optical signal output from the first splitter to obtain an amplified first optical signal, and outputting the amplified first optical signal to a scanner;

the scanner, for outputting the amplified first optical signal to free space and receiving optical signals in free space to obtain a second optical signal;

an optical attenuator, for receiving and attenuating the local optical signal output from the first splitter to obtain an attenuated local optical signal, thereby avoiding damage to a detection pipeline; and the detection pipeline, for comparing the attenuated local optical signal and the second optical signal to calculate a detection distance; the detection pipeline includes a set of balanced photodetectors, a set of spectrometers, a processor, and an optical fiber.

In an embodiment, the set of balanced photodetectors includes first balanced photodetectors and second balanced photodetectors; the set of spectrometers includes a first spectrometer and a second spectrometer.

The present disclosure provides a non-coaxial lidar system, the non-coaxial lidar system is integrated by a plurality of splitters and working parts connected to the plurality of splitters, and the working parts include:

a laser, for emitting light and outputting an optical signal, a first splitter in the plurality of splitters divides the optical signal into a third optical signal and a local optical signal;

an optical amplifier, for receiving and amplifying the third optical signal output from the first splitter to obtain an amplified third optical signal, and transmitting the amplified third optical signal to a first scanner in the two scanners;

two scanners, including a first scanner, for outputting the amplified third optical signal to free space; and a second scanner, for receiving optical signals in free space to obtain a fourth optical signal;

an optical attenuator, for receiving and attenuating the local optical signal output from the first splitter to obtain an attenuated local optical signal, thereby avoiding damage to a detection pipeline; and the detection pipeline, for comparing the attenuated local optical signal and the fourth optical signal to calculate a detection distance; the detection pipeline includes a set of balanced photodetectors, a set of spectrometers, a processor, and an optical fiber Compared with related art, the present disclosure has the following beneficial effects: two-dimensional scanning is performed by the scanner, combined with distance information in the third dimension calculated by the system, thereby achieving three-dimensional imaging and improving the detection accuracy; through joint participation of an optical amplifier and grating antenna groups, noise removal is realized, reducing external interference on detection results and increasing the detection distance. The system is integrated on a chip, has a small size and is easy to install, which is convenient for cost reduction and mass production.

DETAILED DESCRIPTION

The following is a clear and complete description of the technical solutions in the embodiments of the present invention, in conjunction with the accompanying drawings; obviously, the described embodiments are only part of the present invention, not all of them.

Figure 1:
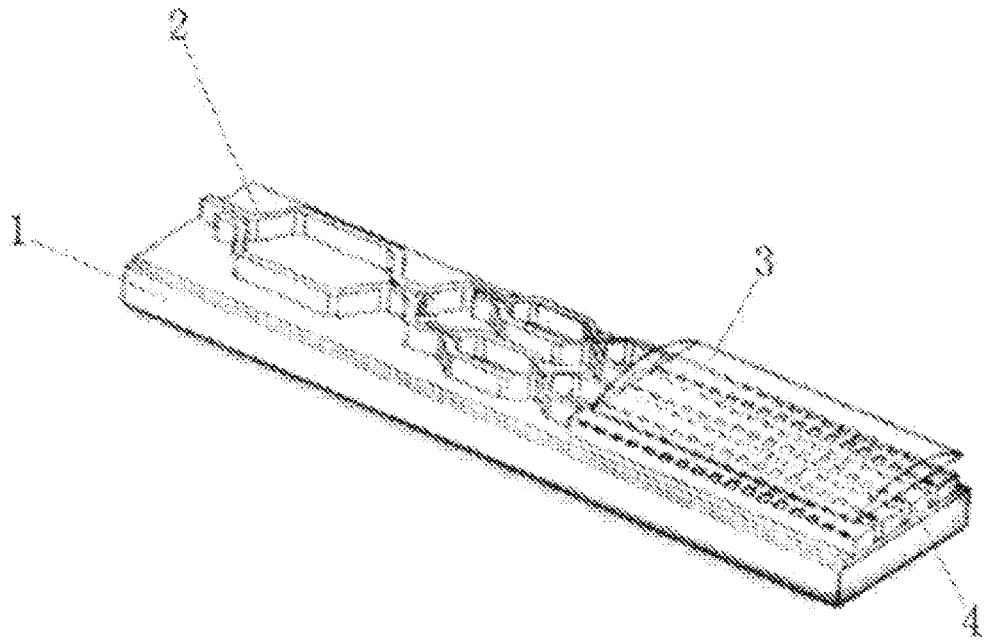
FIG. 1 a schematic diagram of a structure of a scanner according to an embodiment of the present disclosure.

A scanner shown in FIG. 1 includes a wafer substrate 1, a plurality of optical switches 2, and a plurality of grating antenna groups; the plurality of optical switches 2 and the plurality of grating antenna groups are fixed on an upper end of the wafer substrate 1, the plurality of optical switches 2 and the plurality of grating antenna groups correspond one to one, that is, one grating antenna group is optically connected to one optical switch port; the plurality of grating antenna groups are distributed in an array to form a grating part 4, and an upper side of the grating part 4 is covered with a lens module 3; two-dimensional imaging can be realized through the plurality of optical switches 2, the plurality of grating antenna groups and the lens module 3, thus improving ranging accuracy.

Figure 4:
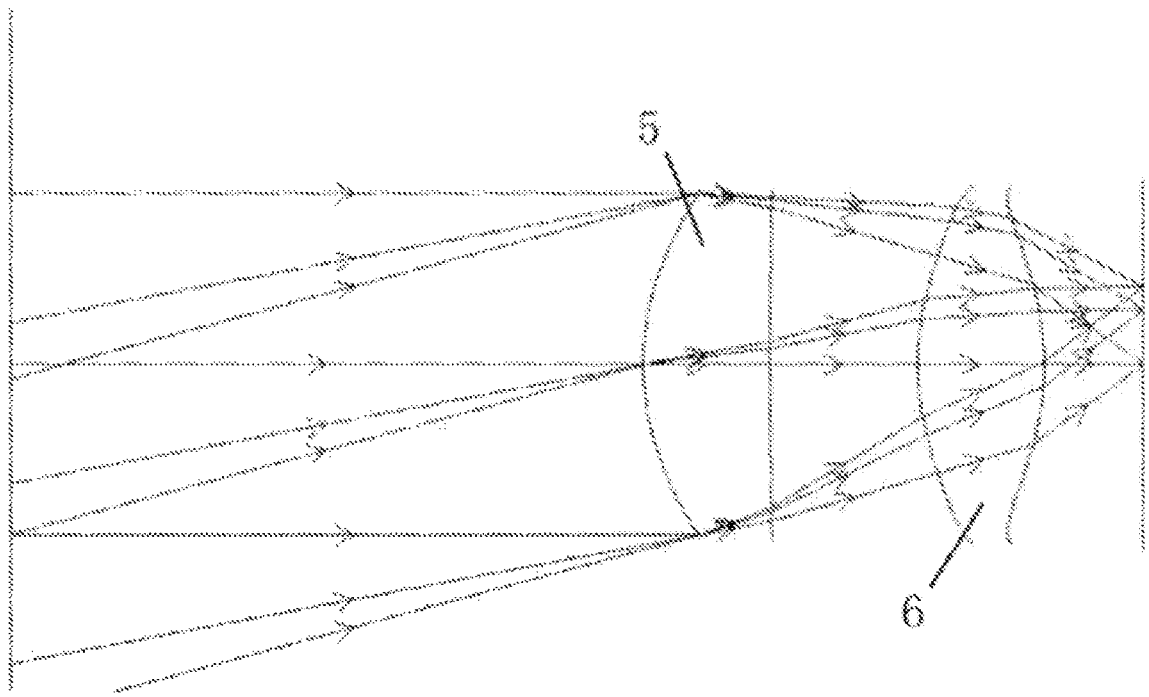
FIG. 4 a schematic diagram of a structure of a lens module according to an embodiment of the present disclosure.

Referring to FIG. 4, the lens module 3 includes a plurality of lenses arranged at intervals, curvature values of the plurality of lenses are different, and the lens module 3 can be finely adjusted up and down on the upper side of the grating part 4 by a lift motor, to ensure that emitting light beams are collimated.

In an embodiment, the lens module 3 includes a first lens 5 and a second lens 6, light sequentially passes from a left object space through the first lens 5 and the second lens 6, and reaches a chip; the following is a detailed description, wherein it is assumed that a size L of the chip is 10 mm, that is, L=10 mm, and a divergence angle θ of the light from the chip is 30 degrees. In order to let all the light out, the numerical aperture NA for the image space of the system is determined to be 0.5 according to the formula NA=n*sin θ, where n indicates a refractive index, and the refractive index n of light in air is 1, that is, n=1; we then assume that a scanning angle θ' of an object space in the actual use scenario is 60 degrees, and a total focal length F of the system is calculated to be 8.6 mm according to tan θ'=L/F; if a focal length of the first lens 5 is $f_1$, a focal length of the second lens 6 is $f_2$, a distance between the centers of the two convex lenses is d, and the distance d may be calculated by the formula $$\frac{1}{F-d} = \frac{1}{f_2} + \frac{1}{f_1 - d}$$

to correct any aberration of the edge field of view.

In an embodiment, the plurality of optical switches 2 and lenses form a two-dimensional scanning mechanism, where the first dimension is scanned in the first dimensional direction through the selective pass of the plurality of optical switches 2 according to the focal plane theorem; secondly, according to the principle of light dispersion, different wavelengths of light pass through the gratings and emit at different angles, to scan the second dimensional direction.

In an embodiment, as can be seen from FIG. 1, the plurality of grating antenna groups are in the shape of long strips; therefore, in order to obtain optimal results and reduce light distortion, the plurality of lenses are cylindrical lenses.

For the grating antennas, the outgoing direction and the direction of the received light meet the formula sin θ=$n_{eff}$-λ/Λ, where θ is an angle of light emitted or received by the grating antennas, λ is the light's wavelength, $n_{eff}$ is an equivalent refractive index of a waveguide (including dielectric waveguide, silicon nitride, lithium niobate, silicon base, etc.), Λ is a grating period; changing the wavelength can change the direction of the received or emitted light of the waveguide grating antennas, and the changing efficiency is given by:

$$\frac{d\theta}{d\lambda} = \frac{dn_{eff}}{d\lambda} - \frac{1}{\Lambda} = (n_{eff} - n_g)/\lambda - \frac{1}{\Lambda};$$

The relationship between the divergence angle Ω and the effective length L is given by:

$$\Omega = \frac{90°}{L}\lambda;$$

In one embodiment, the gratings used here are waveguide gratings; because light can symmetrically emit from two sides of each waveguide grating, other structures are needed to make light emit mainly from one side; for example, a layer of reflective mirror or a multi-layer enhanced reflection film is provided on a waveguide, so that the light emits mainly from the substrate underneath the waveguide; or a reflective structure is placed under the waveguide, and an interference grating is placed on the waveguide, so that the light emits from the side of waveguide away from the reflective structure.

Therefore, the shallower the grating structure is, the weaker perturbation of the light conducted in the waveguide is, which leads to lower radiation rate, larger effective radiation length of the grating, better collimation of emitted light, and light beams that are more convergent.

Embodiment 1

Figure 2:
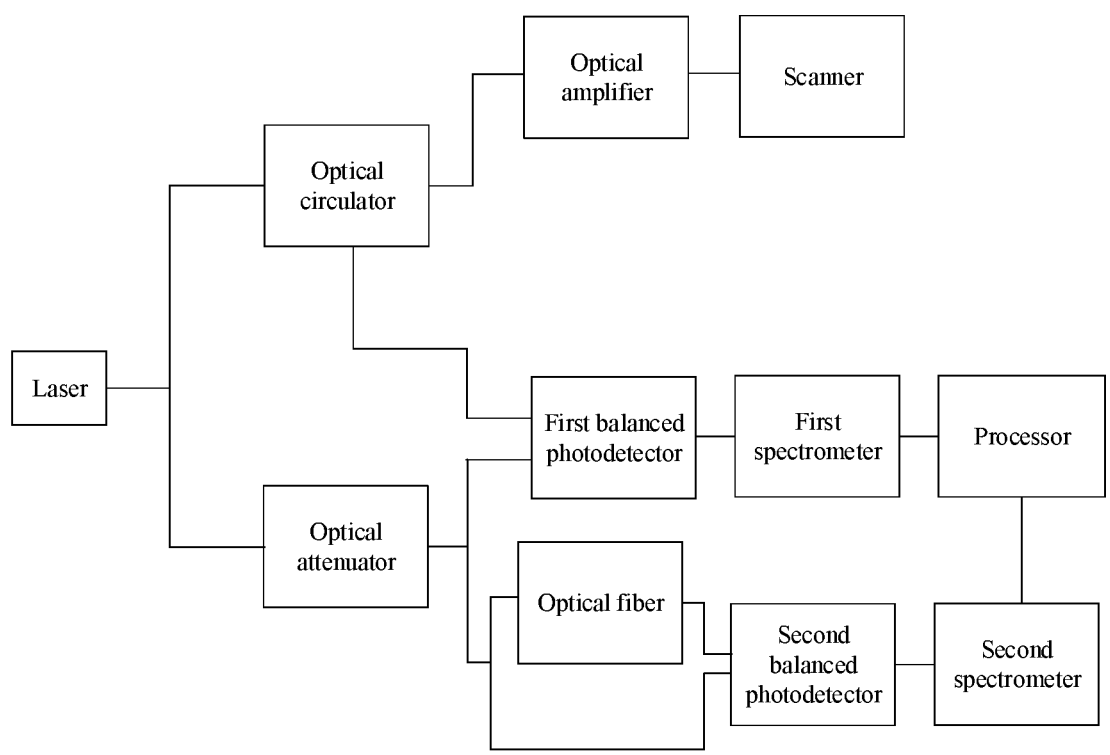
FIG. 2 is a frame diagram of a coaxial lidar system according to an embodiment of the present disclosure.

As shown in FIG. 2, a coaxial lidar system is integrated by a plurality of splitters and working parts connected to the plurality of splitters. The working parts include:

a laser, for emitting light and outputting an optical signal, wherein a first splitter divides the optical signal into a first optical signal and a local optical signal, the first optical signal is transmitted to an optical circulator, and the local optical signal is transmitted to an optical attenuator;

the optical circulator, for enabling bidirectional communication of optical signals; in the embodiment, the optical circulator has three interfaces, for example, a first interface, a second interface, and a third interface; the first interface is connected to an optical amplifier, the second interface is connected to a splitter, and the third interface is connected to a detection pipeline, with a scanner system being connected to the other port of the optical amplifier, to facilitate subsequent calculation of scanning distances;

the optical amplifier, for receiving and amplifying the first optical signal output from the optical circulator to obtain an amplified first optical signal, and outputting the amplified first optical signal to a scanner;

the scanner, for outputting the amplified first optical signal output from the optical amplifier to free space and receiving optical signals in free space to obtain a second optical signal;

the optical attenuator, for receiving and attenuating the local optical signal output from the first splitter to obtain an attenuated local optical signal, thereby avoiding damage to a detection pipeline; and the detection pipeline, for comparing the attenuated local optical signal and the second optical signal to calculate a detection distance; the detection pipeline includes a set of balanced photodetectors, a set of spectrometers, a processor, and an optical fiber.

The set of balanced photodetectors includes first balanced photodetectors and second balanced photodetectors; the set of spectrometers includes a first spectrometer and a second spectrometer.

The specific operations of the detection pipeline are as follows: the second optical signal enters the second interface of the optical circulator through the scanner and the optical amplifier in turn, and is transmitted from the third interface of the optical circulator to input ends of the first balanced photodetectors; meanwhile, an output end of the optical attenuator is connected to a second splitter, an output end of the second splitter is connected to the input ends of the first balanced photodetectors and an input end of the third splitter respectively, and the second splitter divides the attenuated local optical signal into a first local optical signal and a second local optical signal; by treating the first local optical signal as differential, the first balanced photodetectors output the first electrical signal after converting the second optical signal; the first electrical signal is output to the first spectrometer to measure the frequency of the spatial echo, i.e., the frequency of the second optical signal; secondly, an output end of the third splitter is connected to the optical fiber and input ends of the second balanced photodetectors respectively, and an output end of the optical fiber is connected to the input ends of the second balanced photodetectors, the optical fiber delays the second local optical signal, the second balanced photodetectors receive optical signals output from the optical fiber and the third splitter and converts the optical signals into the second electrical signal; the second electrical signal is output to the second spectrometer to obtain the local frequency; the frequency of the spatial echo and the local frequency are transmitted to the processor for digital signal processing, and the time difference is calculated to obtain the distance.

Embodiment 2

Figure 3:
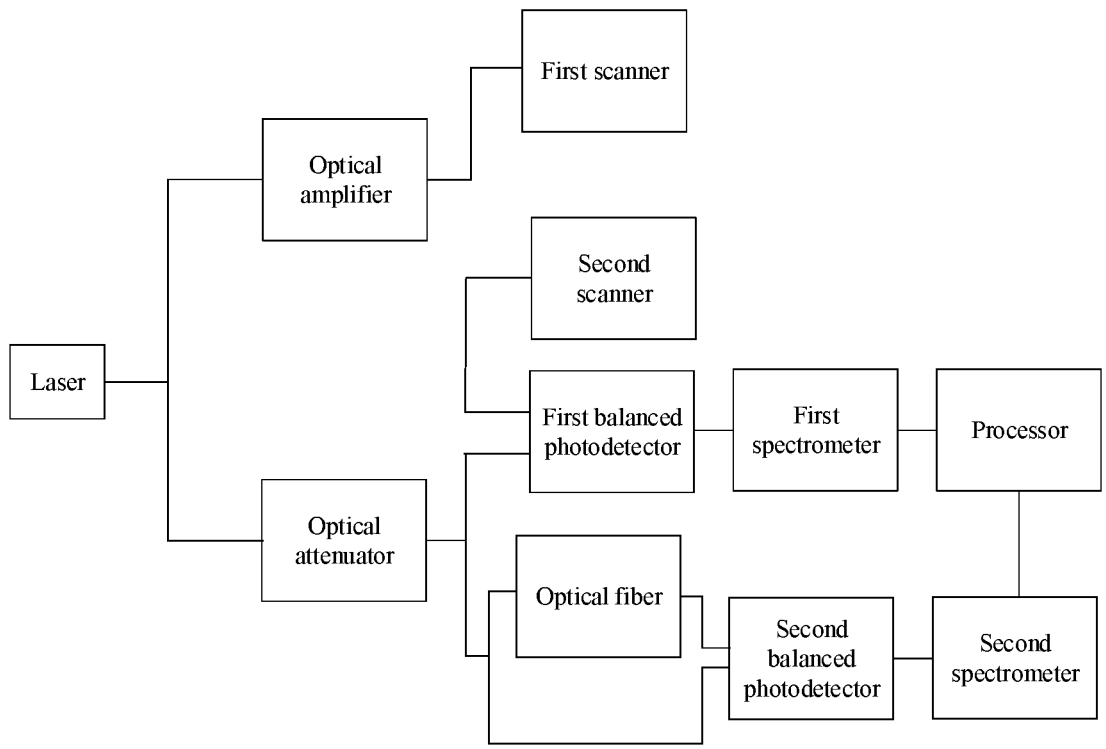
FIG. 3 is a frame diagram of a non-coaxial lidar system according to an embodiment of the present disclosure.

As shown in FIG. 3, a non-coaxial lidar system is integrated by a plurality of splitters and working parts connected to the plurality of splitters; the working parts include:

a laser, for emitting light and outputting an optical signal, wherein a first splitter divides the optical signal output from the laser into a third optical signal and a local optical signal, transmits the third optical signal to an optical amplifier, and transmits the local optical signal to an optical attenuator;

the optical amplifier, for receiving and amplifying the third optical signal to obtain an amplified third optical signal and transmitting the amplified third optical signal to a first scanner; noise removal and power enhancement are performed through the optical amplifier and the plurality of grating antenna groups in the first scanner to improve detection distance and reduce external interference.

the first scanner, for outputting the amplified third optical signal to free space;

a second scanner, for receiving optical signals in free space to obtain a fourth optical signal;

an optical attenuator, for receiving and attenuating the local optical signal to obtain an attenuated local optical signal, thereby avoiding damage to a detection pipeline;

the detection pipeline, for comparing the attenuated local optical signal and the fourth optical signal to calculate a detection distance; the detection pipeline includes a set of balanced photodetectors, a set of spectrometers, a processor, and an optical fiber.

The set of balanced photodetectors includes first balanced photodetectors and second balanced photodetectors; the set of spectrometers include a first spectrometer and a second spectrometer.

The specific operations of the detection pipeline are as follows: the second scanner outputs the fourth optical signal to input ends of the first balanced photodetectors, meanwhile, an output end of the optical attenuator is connected to a second splitter, and an output end of the second splitter is connected to the input ends of the first balanced photodetectors and an input end of the third splitter respectively, the second splitter divides the attenuated local optical signal to the first local optical signal and the second local optical signal; by treating the first local optical signal as differential, the first balanced photodetectors output the first electrical signal after converting the fourth optical signal; the first electrical signal is output to the first spectrometer to measure the frequency of the spatial echo, i.e., the frequency of the fourth optical signal; secondly, an output end of the third splitter is connected to the optical fiber and input ends of the second balanced photodetectors respectively, and an output end of the optical fiber is connected to the input ends of the second balanced photodetectors, the optical fiber delays the second local optical signal, the second balanced photodetectors receive optical signals output from the optical fiber and the second splitter, and converts the optical signals into the second electrical signal; the second electrical signal is output to the second spectrometer to obtain the local frequency; the frequency of the spatial echo and the local frequency are transmitted to the processor for digital signal processing, and the time difference is calculated to obtain the distance In addition, the components of either the embodiment 1 or the embodiment 2 can be packaged and integrated on a single circuit board, reducing the size for easy installation and achieving cost reduction and mass production.

In the description of the present disclosure, it is to be understood that the terms "center", "horizontal", "up", "down", "left", "right", "vertical", "horizontal", "top", "bottom", "inside", "outside" and the like indicate orientations or positional relationships based on those shown in the accompanying drawings, and are intended only to facilitate the description of the present disclosure and to simplify the description, and do not indicate or imply that the device or element referred to must have a particular orientation, be constructed and operated in a particular orientation, and therefore they cannot be construed as exclusive limitations of the present disclosure. Furthermore, the terms "first" and "second" are used for descriptive purposes only and are not to be understood as indicating or implying relative importance or implicitly specifying the number of technical features indicated. Thus, the features qualified with "first" and "second" may explicitly or implicitly include one or more such features. In the description of the present disclosure, unless otherwise stated, "a plurality of" means two or more. In addition, the term "includes" and any variations thereof are intended to cover non-exclusive inclusion.

The present disclosure is described in accordance with the embodiments, and several variations and improvements can be made to the present device without departing from the present principles. It should be noted that all technical solutions obtained by means of equivalent substitution or equivalent transformation, etc., fall within the scope of the present disclosure.

What is claimed is:

1. A coaxial lidar system, wherein the coaxial lidar system is integrated by a plurality of splitters and working parts connected to the plurality of splitters, and the working parts comprise:
   a laser, for emitting light and outputting an optical signal, wherein a first splitter in the plurality of splitters divides the optical signal into a first optical signal and a local optical signal, wherein the light emitted by the laser has a changing wavelength;
   an optical circulator, for enabling bidirectional communication of optical signals; wherein the optical circulator comprises a first interface, a second interface connected to the first splitter, and a third interface;
   an optical amplifier, for amplifying the first optical signal output from the first splitter to obtain an amplified first optical signal, and outputting the amplified first optical signal to a scanner through a first port optical amplifier, wherein the first interface of the optical circulator is connected to a second port of the optical amplifer;
   the scanner, for outputting the amplified first optical signal to free space and receiving optical signals in free space to obtain a second optical signal, wherein the scanner transmits the second optical signal to the optical amplifier, which transmits the second optical signal to the optical circulator; wherein the scanner comprises: a wafer substrate, a plurality of optical switches, and a plurality of grating antenna groups; wherein the plurality of optical switches and the plurality of grating antenna groups are fixed on an upper end of the wafer substrate, the plurality of optical switches and the plurality of grating antenna groups correspond one to one, one grating antenna group is optically connected to one optical switch port; wherein the plurality of grating antenna groups are distributed in an array to form a grating part, and an upper side of the grating part is covered with a lens module; wherein the plurality of grating antenna groups are in a shape of long strips, the lens module comprises a plurality of lenses arranged at intervals, and curvature values of the plurality of lenses are different; wherein the plurality of lenses are cylindrical lenses whose cylindrical axes are parallel to a longitudinal direction of the long strips:
wherein light beams of different wavelengths pass through the grating part and emit at different angles to perform scanning in a first direction according to the principle of light dispersion, wherein the lens module and selective pass of the plurality of optical switches as well as the corresponding grating antenna groups are used to perform scanning in a second dimension according to the focal plane theorem;
   an optical attenuator, for receiving and attenuating the local optical signal output from the first splitter to obtain an attenuated local optical signal, and output the attenuated local optical signal to a detection pipeline; and
   the detection pipeline, for comparing the attenuated local optical signal and the second optical signal to calculate a detection distance; wherein the detection pipeline comprises a set of balanced photodetectors, a set of spectrometers, a processor, and an optical fiber, wherein the third interface of the optical circulator is connected to the detection pipeline.

2. The coaxial lidar system according to claim 1, wherein the set of balanced photodetectors comprises first balanced photodetectors and second balanced photodetectors; the set of spectrometers comprises a first spectrometer and a second spectrometer.

3. The coaxial lidar system according to claim 2, the processor calculates the detection distance based on a time difference between a frequency of a spatial echo received from the first spectrometer and a local frequency received from the second spectrometer.

4. The coaxial lidar system according to claim 3,
   wherein a first input end of the first balanced photodetectors receives the second optical signal from the third interface of the optical circulator,
   wherein the first balanced photodetectors convert the second optical signal into a first electrical signal by treating the first local optical signal as differential, and output the first electrical signal to the first spectrometer,
   wherein the first spectrometer obtains the frequency of the spatial echo by measuring a frequency of the first electrical signal.

5. The coaxial lidar system according to claim 3, wherein an output end of the optical attenuator is connected to a second splitter, an output end of the second splitter is connected to a second input end of the first balanced photodetectors and an input end of a third splitter respectively, and the second splitter divides the attenuated local optical signal into a first local optical signal and a second local optical signal.

6. The coaxial lidar system according to claim 5,
   wherein an output end of the third splitter is connected to the optical fiber and input ends of the second balanced photodetectors respectively,
   wherein an output end of the optical fiber is connected to the input ends of the second balanced photodetectors,
   wherein the optical fiber delays the second local optical signal to obtain a delayed second local optical signal,
   wherein the second balanced photodetectors receive the delayed second local optical signal from the optical fiber and the first local optical signal from the third splitter, and converts the delayed second local optical signal and the first local optical signal into a second electrical signal;
   wherein the second spectrometer receives the second electrical signal, and obtains the local frequency based the second electrical signal.

7. The coaxial lidar system according to claim 1, wherein the lens module is slidably attached to the grating part, and capable of being finely adjusted up and down on the upper side of the grating part by a lift motor.

8. A non-coaxial lidar system, wherein the non-coaxial lidar system is integrated by a plurality of splitters and working parts connected to the plurality of splitters, and the working parts comprise:
   a laser, for emitting light and outputting an optical signal, wherein a first splitter in the plurality of splitters divides the optical signal into a third optical signal and a local optical signal, wherein the light emitted by the laser has a changing wavelength;

an optical amplifier, for receiving and amplifying the third optical signal output from the first splitter to obtain an amplified third optical signal;

two scanners, wherein the two scanners comprise: a first scanner, for receiving the amplified third optical signal transmitted from the optical amplifier and outputting the amplified third optical signal to free space; and a second scanner, for receiving optical signals in free space to obtain a fourth optical signal; wherein each of the two scanners comprises: a wafer substrate, a plurality of optical switches, and a plurality of grating antenna groups; wherein the plurality of optical switches and the plurality of grating antenna groups are fixed on an upper end of the wafer substrate, the plurality of optical switches and the plurality of grating antenna groups correspond one to one, one grating antenna group is optically connected to one optical switch port; wherein the plurality of grating antenna groups are distributed in an array to form a grating part, and an upper side of the grating part is covered with a lens module; wherein the plurality of grating antenna groups are in a shape of long strips, the lens module comprises a plurality of lenses arranged at intervals, and curvature values of the plurality of lenses are different; wherein the plurality of lenses are cylindrical lenses whose cylindrical axes are parallel to a longitudinal direction of the long strips; wherein light beams of different wavelengths pass through the grating part and emit at different angles to perform scanning in a first direction according to the principle of light dispersion, wherein the lens module and selective pass of the plurality of optical switches as well as the corresponding grating antenna groups are used to perform scanning in a second dimension according to the focal plane theorem;

an optical attenuator, for receiving and attenuating the local optical signal output from the first splitter to obtain an attenuated local optical signal, and outputting the attenuated local signal to a detection pipeline; and the detection pipeline, for comparing the attenuated local optical signal and the fourth optical signal to calculate a detection distance; wherein the detection pipeline comprises a set of balanced photodetectors, a set of spectrometers, a processor, and an optical fiber.

9. The non-coaxial lidar system according to claim 8, wherein the set of balanced photodetectors comprise first balanced photodetectors and second balanced photodetectors, and the set of spectrometers comprise a first spectrometer and a second spectrometer.

10. The non-coaxial lidar system according to claim 9, the processor calculates the detection distance based on a time difference between a frequency of a spatial echo received from the first spectrometer and a local frequency received from the second spectrometer.

11. The non-coaxial lidar system according to claim 10, wherein the second scanner outputs the fourth optical signal to a first input end of the first balanced photodetectors, wherein the first balanced photodetectors convert the fourth optical signal into a first electrical signal by treating the first local optical signal as differential, and output the first electrical signal to the first spectrometer, wherein the first spectrometer obtains the frequency of the spatial echo by measuring a frequency of the first electrical signal.

12. The non-coaxial lidar system according to claim 10, wherein an output end of the optical attenuator is connected to a second splitter, an output end of the second splitter is connected to a second input end of the first balanced photodetectors and an input end of a third splitter respectively, and the second splitter divides the attenuated local optical signal into a first local optical signal and a second local optical signal.

13. The non-coaxial lidar system according to claim 12, wherein an output end of the third splitter is connected to the optical fiber and input ends of the second balanced photodetectors respectively, wherein an output end of the optical fiber is connected to the input ends of the second balanced photodetectors, wherein the optical fiber delays the second local optical signal to obtain a delayed second local optical signal, wherein the second balanced photodetectors receive the delayed second local optical signal from the optical fiber and the first local optical signal from the third splitter, and converts the delayed second local optical signal and the first local optical signal into a second electrical signal;

wherein the second spectrometer receives the second electrical signal, and obtains the local frequency based the second electrical signal.

14. The non-coaxial lidar system according to claim 8, wherein the lens module is slidably attached to the grating part, and capable of being finely adjusted up and down on the upper side of the grating part by a lift motor.

* * * * *